Patented Dec. 26, 1950

2,535,992

UNITED STATES PATENT OFFICE 2,535,992

THIAZOLONE CYANINE DYE INTERMEDIATES

Thomas R. Thompson, Binghamton, N. Y., assignor to General Aniline & Film Corporation, New York, N. Y., a corporation of Delaware No Drawing. Application December 21, 1948, Serial No. 66,571

4 Claims. (Cl. 260—240.1)

This invention relates to new thiazolone cyanine dye intermediates which are useful for the preparation of trinuclear and tetranuclear cyanine dyes as sensitizers for photographic silverhalide emulsions.

It is known that anilinomethylene derivatives of 5-membered keto heterocyclic nitrogenous bases and their vinylogs have been utilized in the past for the preparation of merocyanine dyes. Another process involves treating, in the presence of a trialkylamine, a cyclammonium alkyl quaternary salt containing in a reactive position a β-anilinovinyl group with a heterocyclic compound containing a nuclear reactive methylene group adjacent to a nuclear carbonyl or thiocarbonyl group. The dyes thus obtained are dinuclear and can only be converted by subsequent processing to trinuclear dyes (rhodacarbocyanines) when the ketoheterocyclic nucleus contains a thiocarbonyl group. Such a dye is further treated with a quaternizing compound such as methyl iodide. The quaternized compound, which contains a thioether group, is then condensed under reflux conditions with a cyclammonium base or salt of the type usual in cyanine dyes, such as 2-methylbenzothiazole ethiodide having a reactive methyl group in a-position to the nitrogen atom thereof in the presence of a condensing agent such as pyridine, etc. In the first reaction (alkylation), the dye is modified to the extent that the nitrogen atom of the thiocarbonyl nucleus is quaternized and the sulfur atom is converted to a thioether group. In the second reaction (condensation), the alkylated merocyanine dye is condensed with a cyclammonium base or salt to yield trinuclear dyes.

I have found that thiazolone cyanine dyes can be treated with a diarylformamidine or its vinylog such as β-anilinoacrolein anil hydrochloride or glutaconic aldehyde dianil hydrochloride to yield the corresponding anilino or acetanilido mono and polymethine derivatives which are useful as intermediates for the preparation of polynuclear dyes. Intermediates containing a terminal saturated nitrogenous heterocyclic nucleus are obtained by heating a thiazolone cyanine dye with diaryl formamidine or its vinylog in the presence or absence of an aliphatic alcohol as a diluent and in the presence of a saturated nitrogenous heterocyclic compound as will be pointed out hereinafter. The intermediates readily react in one single operation, i. e., in one condensation reaction, with a cyclammonium quaternary salt in the presence of a basic condensing agent to give a trinuclear dye. When such intermediates are condensed with heterocyclic ketomethylene compounds, such as N-alkyl, aryl or aralkyl substituted derivatives of rhodanine, novel trinuclear dyes result which are unobtainable by any known procedure. When such intermediates are treated with a thiazolone cyanine dye, both symmetrical and unsymmetrical tetranuclear dyes are obtained. Although symmetrical tetranuclear dyes are known, there is no method, other than by the use of the intermediates of the present invention, which would lead to unsymmetrical tetranuclear dyes.

It is an object of the present invention to provide a new class of thiazolone cyanine dye intermediates which are useful for the preparation of polynuclear cyanine dyes.

Other objects and advantages of this invention will become apparent by reference to the following specification in which its preferred details and embodiments are described.

The thiazolone cyanine dye intermediates prepared according to the present invention are characterized by the following general formulae:

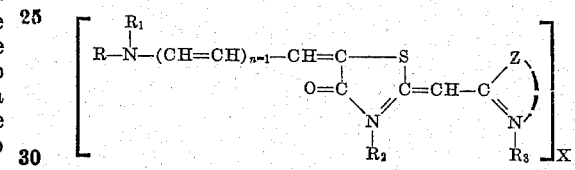

and

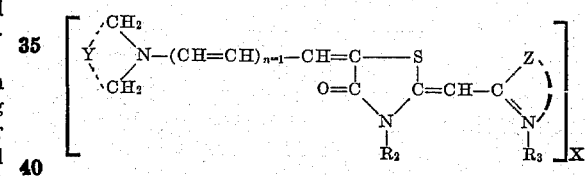

wherein R represents an aryl group of the benzene and naphthalene series, such as phenyl, chlorophenyl, diphenyl, tolyl, or naphthyl, $R_1$ represents either hydrogen or an acetyl group, $R_2$ represents an alkyl, allyl, aryl, or aralkyl group, e. g., methyl, ethyl, propyl, phenyl, naphthyl, tolyl, benzyl, and the like, $R_3$ represents an aliphatic radical, e. g., methyl, ethyl, propyl, butyl, hydroxyethyl, ethoxyethyl, an aryl radical, e. g., phenyl, naphthyl, tolyl and the like, or an aralkyl radical, such as benzyl, phenethyl, menaphthyl, and the like, n represents a positive integer of from 1 to 3, X represents an acid radical, e. g., chloride, bromide, iodide, or alkyl sulfate, alkyl p-toluenesulfonate or perchlorate, Y represents the atoms necessary to complete a saturated heterocyclic nitrogenous nucleus, such as, for example, piperidine, β- and γ-pipecoline, pyrrolidine, morpholine, tetrahydroquinoline, and the like, and Z represents the atoms necessary to complete a nitrogenous heterocyclic ring system of the type used in cyanine dyes such as pyridine, pyrroline, lepidine, quinoline, indolenine, oxazole, thiazoline, thiazole, thiodiazole, selenazole, selenazoline, oxazoline, benzothiazole, benzoselenazole, benzoxazole, naphthothiazole, peri-naphthothiazole, naphthoselenazo.e, and the like.

The dyestuff intermediates illustrated by the above formula are obtained by treating a diarylformamidine, β-anilinoacrolein anil hydrochloride or glutaconic aldehyde dianil hydrochloride, in the presence of an acid condensing agent such as acetic anhydride or in the presence of a basic condensing agent such as triethylamine and the like with a thiazolone cyanine dye of the general formula:

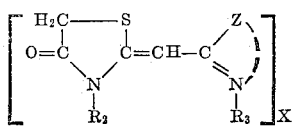

wherein R₂, R₃, X and Z have the same values as above.

The thiazolone cyanine dyes characterized by the foregoing formula are prepared according to the method described in my copending application Serial No. 786,814, filed November 18, 1947. In general, the method consists of condensing a substituted thioamide with an α-halogen acetic acid. The compounds, in view of their ketomethylene configuration, undergo keto-enol tautomerism, i. e., the keto group enolizes to form a hydroxyl group. In preparing the dyestuff intermediates, the thiazolone cyanine dye intermediate characterized by the foregoing general formula is simply treated with a diarylformamidine, β-anilinoacrolein anil hydrochloride, or with glutaconic aldehyde dianilido hydrochloride. When the anilino intermediate is desired, the treatment is conducted in the presence or absence of a solvent-diluent such as ethyl alcohol and in the presence of a basic condensing agent, such as trialkylamine, i. e., triethylamine by simply allowing the mixture to stand at room temperature for a period of time ranging from 1 to 24 hours. The compound separates from the reaction mixture and is recrystallized from methyl or ethyl alcohol. When the acetanilido intermediate is desired, the coreactants are simply heated to reflux in the presence of acetic anhydride for a period of time ranging from 10 minutes to 2 hours. The product separates from the cooled reaction mixture and is purified by recrystallization from methyl alcohol. When an intermediate containing a terminal saturated heterocyclic nitrogenous nucleus is desired, the coreactants are heated in the presence or absence of an aliphatic alcohol such as methanol, ethanol, isopropanol, and the like, and in the presence of a saturated nitrogenous heterocyclic compound, such as piperidine, morpholine, and the like.

The following examples illustrate the preparation of the thiazolone cyanine dyes which are utilized in the preparation of the dyestuff intermediates:

*Example I*

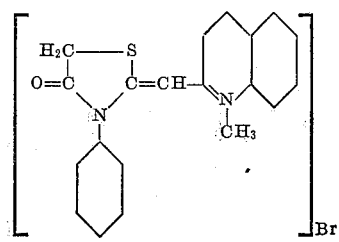

A mixture of 5.5 grams of α-(1-methyl-2-quinolylidene) thioacetanilide and an equal weight of bromacetic acid was dissolved in 50 cc. of n-butanol and heated at 100° C. for 10 minutes. On cooling, yellow crystals formed which were filtered and washed with ether. Recrystallization from methanol yielded yellow crystals melting at 212° C.

*Example II*

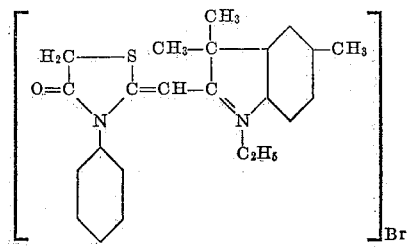

6.9 grams of α-(1-ethyl-3,3,5-trimethylindolinylidene) thioacetanilide were heated with 6.9 grams of bromacetic acid in 25 cc. of n-butanol at 105–110° C. for 10 minutes. The mixture was treated with ether and the ether layer decanted. The black liquid was stirred with isopropanol and filtered. The residue was recrystallized from methanol to yield 1.7 grams of the final dye having a melting point at 236–238° C.

*Example III*

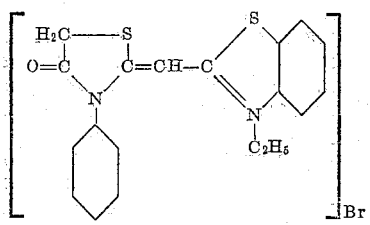

A mixture of 25 grams of α-(3-ethylbenzothiazolylidine) thioacetanilide and 25 grams of bromacetic acid was heated in 50 cc. of n-butanol for 10 minutes at 110° C., the solution becoming deep yellow in color. The mixture was cooled, stirred with ether, filtered, and washed with ether. The residue was dried at 80° C. to yield 34.9 grams of a solid, melting at 231–236° C. A 10 gram fraction of this was recrystallized from methanol to yield 7.7 grams of the final dye, melting at 233–234° C.

*Example IV*

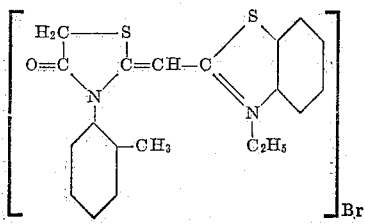

4 grams of α-(3-ethylbenzothiazolylidene)thio-acet-o-toluide, 4 grams of bromacetic acid, and 8 cc. of n-butanol were treated as in Example III to yield 3.9 grams of a thiazolone cyanine dye melting at 240–241° C.

*Example V*

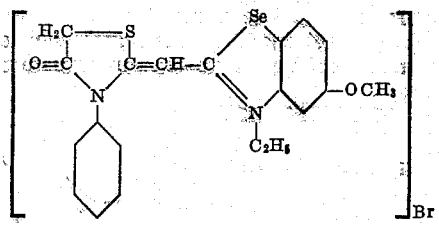

A mixture of 4.11 grams of α-(3-ethyl-5-methoxybenzoselenazolylidene)thioacetanilide, 4.11 grams of bromacetic acid, and 45 cc. of n-butanol was heated at 90° C. for 20 minutes and at 110° C. for 10 minutes. The thick slurry of greenish crystals was thinned with three volumes of ether and filtered to yield 5.0 grams of a product, melting at 283–284° C.

*Example VI*

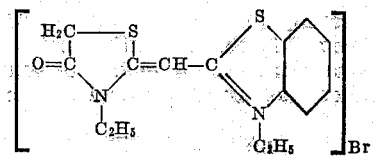

A mixture of 1.5 grams of α-(3-ethylbenzothiazolylidene)-N-ethylthioacetamide, 1.5 grams of bromacetic acid and 5 cc. of acetic acid was heated at 120° C. for 5 minutes. After cooling, the product was precipitated with ether and dried to yield 2.07 grams.

The anions of the foregoing thiazolone cyanine dye salts may be replaced by iodide, thiocyanate or perchlorate ions, by treating an alcohol solution of the dye salt with an aqueous or aqueous-alcohol solution containing a sodium or potassium salt of the desired anion.

The following examples describe the preparation of the thiazolone cyanine dye intermediates from the foregoing thiazolone cyanine dyes. It is to be understood that they are given merely for the purpose of illustration and are not to be construed as limitative.

*Example VII*

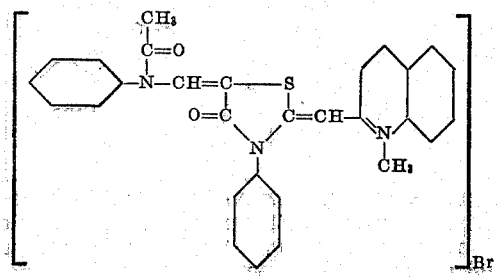

A mixture of 2.0 grams of diphenylformamidine, 2.0 grams of the thiazolone cyanine dye of Example I and 10 cc. acetic anhydride was heated at 140° C. for 30 minutes. The product was precipitated with ether and purified by boiling it out with acetone. A yield of 2.1 grams of a product, having a melting point of 186–190° C., was obtained.

*Example VIII*

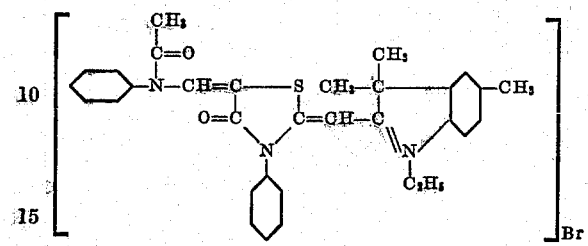

A mixture of 2.0 grams of diphenylformamidine, 2.0 grams of the thiazolone cyanine dye of Example II, and 10 cc. of acetic anhydride was heated at 140° C. for 30 minutes. After precipitating the product with ether, purification was effected by boiling it out with a small amount of acetone. A yield of 2.3 grams of a product, having a melting point of 230–231° C., was obtained.

*Example IX*

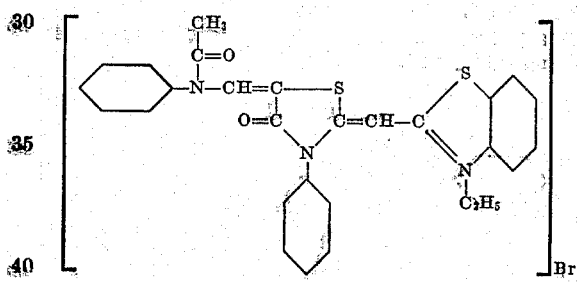

A mixture of 5.0 grams of diphenylformamidine, 5.0 grams of the thiazolone cyanine dye of Example III, and 15 cc. of acetic anhydride was heated at 140° C. for 30 minutes. After cooling, the product was precipitated with ether and purified by dissolving it in a minimum amount of methanol followed by the addition of ether. There was obtained a yield of 3.3 grams of yellow crystals, having a melting point of 231–232° C.

*Example X*

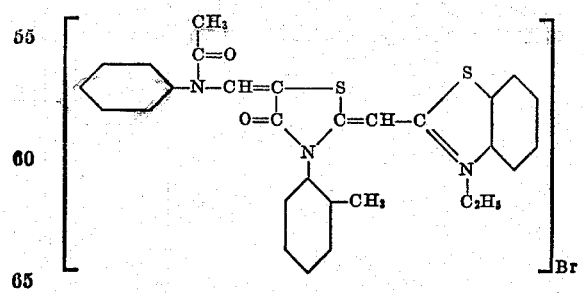

A mixture of 5 grams of diphenylformamidine, 5 grams of the thiazolone cyanine dye of Example IV, and 15 cc. of acetic anhydride was heated at 140° C. for 30 minutes. After cooling, the product was precipitated with ether and purified by dissolving it in a small amount of methanol followed by precipitation with ether. A yield of 5.9 grams of yellow-green crystals, having a melting point at 213–215° C. was obtained.

Example XI

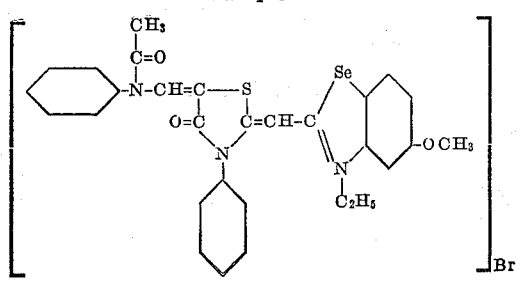

A mixture of 2.0 grams of diphenylformamidine, 2.0 grams of the thiazolone cyanine dye of Example V, and 10 cc. of acetic anhydride was heated at 140° C. for 30 minutes. The product was precipitated from the cooled reaction mixture by the addition of ether and was purified by boiling out with methanol. A yield of 0.7 gram of a product, having a melting point of 243-244° C. was obtained.

Example XII

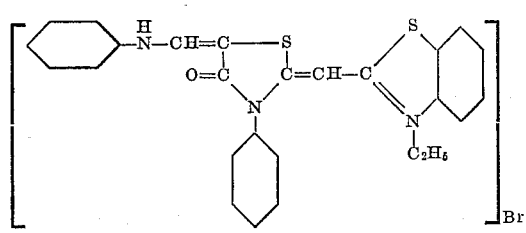

A mixture of 2.0 grams of the thiazolone cyanine dye of Example III, 1.0 gram of diphenylformamidine, and 10 cc. of ethylene glycol was heated with stirring for 10 minutes at 95° C. The product was precipitated from the cooled reaction mixture by the addition of 25 cc. of ether. The yellow solid was purified by boiling out with isopropanol. A yield of 1.4 grams of a product, having a melting point of 239-241° C., was obtained. A methanol solution of the product has an absorption maximum at 480 m$\mu$.

EXAMPLE XIII

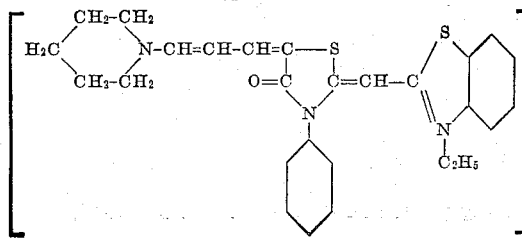

A mixture of 0.5 gram of the product of Example III, 0.3 gram of β-anilinoacrolein anil hydrochloride, 10 cc. of methanol, and 0.5 gram of piperidine was heated at reflux for 5 minutes. The reaction mixture was poured into 60 cc. of water containing 1 gram of potassium iodide. The crystals were separated and purified by boiling out with isopropyl alcohol. A yield of 0.4 gram of a product having a melting point of 270-271° C. was obtained. A methanol solution of the compound has an absorption maximum at 540 m$\mu$.

EXAMPLE XIV

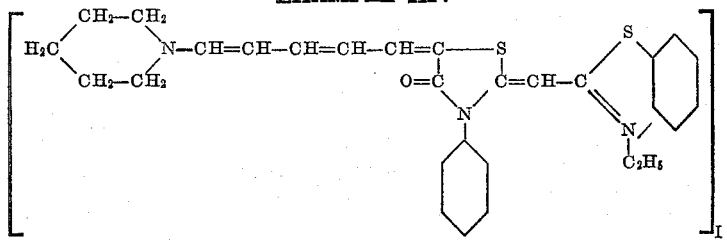

A mixture of 2.85 grams of glutaconaldehyde dianil hydrochloride, 4.3 grams of the compound of Example III, 1 cc. of piperidine and 50 cc. of methanol was heated at reflux for 30 minutes. The reaction mixture was poured into 300 cc. of water containing 5 grams of potassium iodide. The precipitated product was filtered and boiled out with isopropyl alcohol. A yield of 3.7 grams of a compound having a melting point of 195-198° C. was obtained. A methanol solution of the product has an absorption maximum at 624 m$\mu$.

EXAMPLE XV

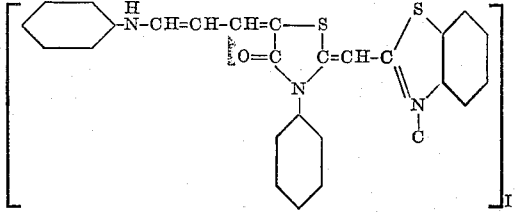

A mixture of 1.3 grams of β-anilinoacrolein anil hydrochloride, 2.0 grams of the thiazolone cyanine dye of Example III, 40 cc. of methanol, and 0.7 cc. of triethylamine was heated at reflux for 5 minutes. The product was precipitated as the iodide salt by adding 2 cc. of a 20% solution of sodium iodide in methanol, and purified by boiling out with isopropyl alcohol. A yield of 1.4 grams of a product with a melting point of 204-205° C. was obtained. In methanol solution this product absorbs with a maximum at 545 m$\mu$.

EXAMPLE XVI

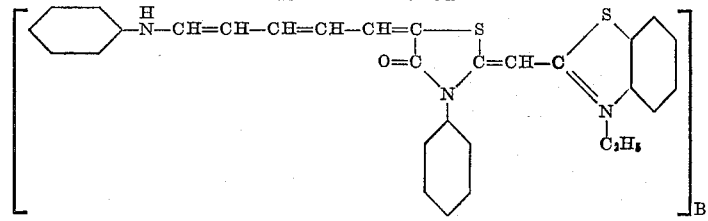

A mixture of 1.4 grams of glutaconaldehyde dianil hydrochloride, 2.0 grams of the thiazolone cyanine dye of Example III, 40 cc. of methanol, and 0.7 cc. of triethylamine was refluxed for 5 minutes. The product was precipitated with ether and purified by boiling out with isopropyl alcohol. A yield of 1.8 grams of a product with a melting point of 191-193° C. was obtained. The absorption maximum of a methanol solution of this product is at 620 m$\mu$.

While I have disclosed the preferred embodiments of my invention and the preferred modes of carrying the same into effect, it will be readily apparent by those skilled in the art that many variations may be made therein without departing from the spirit thereof. Accordingly, the scope of my invention is to be limited solely by the appended claims.

I claim:

1. A thiazolone cyanine dyestuff intermediate characterized by a formula selected from the class consisting of the following formulae:

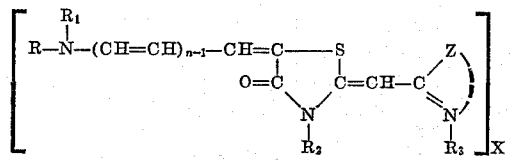

and

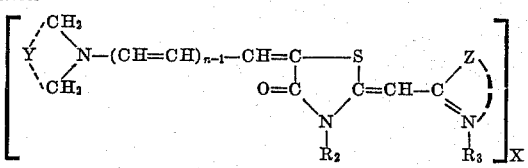

wherein R represents an aryl group of the benzene and naphthalene series, $R_1$ represents a member selected from the class consisting of hydrogen and acetyl, $R_2$ represents a member selected from the class consisting of alkyl, allyl, aryl, and aralkyl groups, $R_3$ represents a member selected from the class consisting of lower alkyl, lower hydroxyalkyl, lower alkoxyalkyl, aryl group of the benzene and naphthalene series, and aralkyl groups, $n$ represents a positive integer of from 1 to 3, X represents an acid radical, Y represents the atoms necessary to complete a saturated heterocyclic nitrogenous nucleus selected from the class consisting of piperidine, $\beta$- and $\gamma$-pipecoline, pyrrolidine, morpholine, and tetrahydroquinoline, and Z represents the atoms necessary to complete a heterocyclic nitrogenous nucleus of the type used in cyanine dyes.

2. A thiazolone cyanine dyestuff intermediate having the following formula:

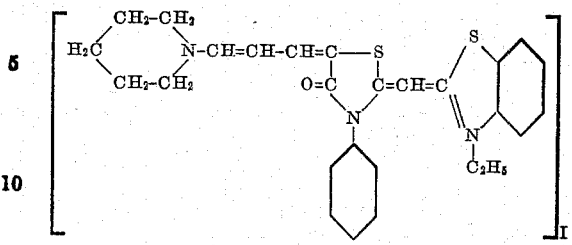

3. A thiazolone cyanine dyestuff intermediate having the following formula:

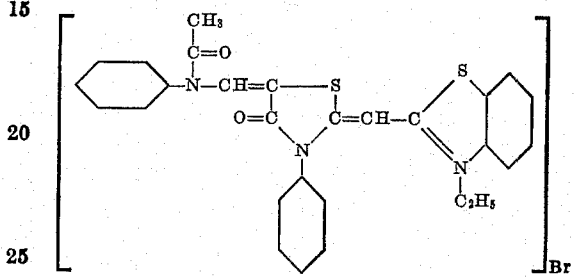

4. A thiazolone cyanine dyestuff intermediate having the following formula:

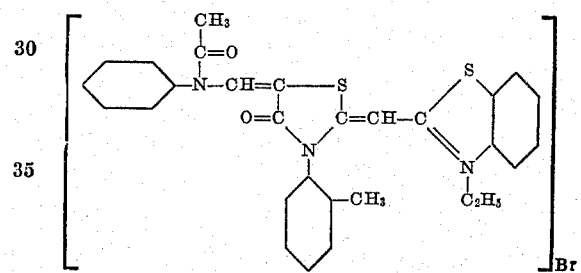

THOMAS R. THOMPSON.

No references cited.

Certificate of Correction

December 26, 1950

Patent No. 2,535,992

THOMAS R. THOMPSON

It is hereby certified that error appears in the printed specification of the above numbered patent requiring correction as follows:

Column 8, lines 40 to 42, Example XV, for that portion of the formula reading  and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*